(12) United States Patent
Culbert et al.

(10) Patent No.: US 8,180,546 B2
(45) Date of Patent: May 15, 2012

(54) ELECTRONIC BRAKE CONTROLLER

(75) Inventors: Jeffery S. Culbert, Albertville, AL (US); Charles L. Robertson, Horton, AL (US)

(73) Assignee: Hayes Brake Controller Company, LLC, Arab, AL (US)

( * ) Notice: Subject to any disclaimer, the term of this patent is extended or adjusted under 35 U.S.C. 154(b) by 192 days.

(21) Appl. No.: 12/706,172

(22) Filed: Feb. 16, 2010

(65) Prior Publication Data

US 2010/0222979 A1 Sep. 2, 2010

Related U.S. Application Data

(60) Provisional application No. 61/156,222, filed on Feb. 27, 2009, provisional application No. 61/157,780, filed on Mar. 5, 2009.

(51) Int. Cl.
*G06F 7/70* (2006.01)
(52) U.S. Cl. ............................................. 701/70; 303/7
(58) Field of Classification Search .................. 701/70; 303/7, 20
See application file for complete search history.

(56) References Cited

U.S. PATENT DOCUMENTS

| | | |
|---|---|---|
| 3,566,987 A | 3/1971 | Franzel |
| 3,738,710 A | 6/1973 | Pokrinchak et al. |
| 3,771,840 A | 11/1973 | Hubbard |
| 3,780,832 A | 12/1973 | Marshall |
| 3,819,234 A | 6/1974 | Couchois et al. |
| 4,084,859 A | 4/1978 | Bull et al. |
| 4,398,252 A | 8/1983 | Frait |
| 4,524,312 A | 6/1985 | Matsumoto et al. |
| 4,721,344 A | 1/1988 | Frait et al. |
| 4,726,627 A | 2/1988 | Frait et al. |
| 4,856,850 A | 8/1989 | Aichele et al. |
| 5,050,937 A | 9/1991 | Eccleston et al. |
| 5,149,176 A | 9/1992 | Eccleston |
| 5,352,028 A | 10/1994 | Eccleston |
| 5,615,930 A | 4/1997 | McGrath et al. |
| 5,620,236 A | 4/1997 | McGrath et al. |
| 5,741,048 A | 4/1998 | Eccleston |
| 5,782,542 A | 7/1998 | McGrath et al. |
| 5,785,393 A | 7/1998 | McGrath et al. |
| 5,800,025 A | 9/1998 | McGrath et al. |
| 5,949,147 A | 9/1999 | McGrath et al. |
| 6,012,780 A | 1/2000 | Duvernay |
| 6,039,410 A | 3/2000 | Robertson et al. |
| 6,068,352 A | 5/2000 | Kulkarni et al. |
| 6,179,390 B1 | 1/2001 | Guzorek et al. |
| 6,325,466 B1 | 12/2001 | Robertson et al. |
| 6,367,588 B1 | 4/2002 | Robertson et al. |
| 6,445,993 B1 | 9/2002 | Eccleston et al. |
| 6,532,419 B1 | 3/2003 | Begin et al. |
| 6,557,952 B1 | 5/2003 | Robertson et al. |
| 6,615,125 B2 | 9/2003 | Eccleston et al. |
| 6,619,759 B2 | 9/2003 | Bradsen et al. |
| 6,655,752 B2 | 12/2003 | Robertson et al. |
| 6,837,551 B2 | 1/2005 | Robinson et al. |
| D515,483 S * | 2/2006 | Culbert ................. D12/180 |
| 7,311,364 B2 * | 12/2007 | Robertson .................. 303/7 |
| 7,575,286 B2 | 8/2009 | Robertson |
| 2008/0309156 A1 * | 12/2008 | Kissel ...................... 303/20 |
| 2010/0152989 A1 * | 6/2010 | Smith et al. ............... 701/78 |

* cited by examiner

*Primary Examiner* — Thomas G. Black
*Assistant Examiner* — Shardul Patel
(74) *Attorney, Agent, or Firm* — MacMillan, Sobanski & Todd, LLC

(57) ABSTRACT

A controller for electric trailer brakes that includes a three axis accelerometer for detecting deceleration of a towing vehicle and an interactive liquid crystal display controlled by a plurality of pushbuttons.

10 Claims, 9 Drawing Sheets

ELECTRONIC BRAKE CONTROLLER

CROSS-REFERENCE TO RELATED APPLICATIONS

This application claims the benefit of U.S. Provisional Application No. 61/156,222, filed Feb. 27, 2009, and U.S. Provisional Application No. 61/157,780, filed Mar. 5, 2009, the disclosures of which are incorporated herein by reference.

BACKGROUND OF THE INVENTION

This invention relates in general to trailer brake controllers and in particular to electronic brake controllers.

Towed vehicles, such as recreational and utility trailers that are towed by automobiles and small trucks, are commonly provided with electric wheel brakes. The electric wheel brakes generally include a pair of brake shoes which, when actuated, frictionally engage a brake drum. An electromagnet is mounted on one end of a lever to actuate the brake shoes. When an electric current is applied to the electromagnet, the electromagnet is drawn against the rotating brake drum which pivots the lever to actuate the brakes. Typically, the braking force produced by the brake shoes is proportional to the electric current applied to the electromagnet. This electric current can be relatively large. For example, the electric wheel brakes on a two wheeled trailer can draw six amperes of current when actuated and the electric wheel brakes on a four wheeled trailer can draw 12 amperes of current.

Automotive industry standards require that electrically-actuated vehicle wheel brakes be driven against the ground potential of the vehicle power supply. Accordingly, one end of each of the towed vehicle wheel brake electromagnets is electrically connected to the towed vehicle ground and the towed vehicle ground is electrically connected to the towing vehicle ground. The other end of each of the wheel brake electromagnets is electrically connected through an electric wheel brake controller to the towing vehicle power supply.

Various electric brake controllers for towed vehicle electric brakes are known in the art. For example, a variable resistor, such as a rheostat, can be connected between the towing vehicle power supply and the brake electromagnets. Such an actuator is disclosed in U.S. Pat. No. 3,740,691. The towing vehicle operator manually adjusts the variable resistor setting to vary the amount of current supplied to the brake electromagnets and thereby control the amount of braking force developed by the towed vehicle wheel brakes.

It also is known to include an integrating circuit in an electric wheel brake controller. When the towing vehicle brakes are applied, a signal is sent to the integrating circuit. The integrating circuit generates a continually increasing voltage which is applied to the electric wheel brakes. The longer the towing vehicle brakes are applied, the more brake torque is generated by the actuator. A manually adjustable resistor typically controls the rate of integration. One such actuator is disclosed in U.S. Pat. No. 3,738,710.

Also known in the art are more sophisticated electric wheel brake controllers which include electronic circuitry to automatically supply current to the towed vehicle brake electromagnets that is proportional to the towing vehicle deceleration when the towing vehicle brakes are applied. Such electronic wheel brake controllers typically include a sensing unit that automatically generates a brake control signal corresponding to the desired braking effort. For example, the sensing unit can include a pendulum which is displaced from a rest position when the towing vehicle decelerates and an electronic circuit which generates a brake control signal that is proportional to the amount of pendulum displacement. One such unit is disclosed in U.S. Pat. No. 4,721,344. Alternately, the hydraulic pressure in the towing vehicle's braking system or the pressure applied by the vehicle operator's foot to the towing vehicle's brake pedal can be sensed to generate the brake control signal. An example of a controller which senses the towing vehicle brake pressure to generate the brake control signal is disclosed in U.S. Pat. No. 4,398,252.

Known electronic wheel brake controllers also usually include an analog pulse width modulator. The input of the pulse width modulator is electrically connected to the sensing unit and receives the brake control signal therefrom. The pulse width modulator is responsive to the brake control signal to generate an output signal comprising a fixed frequency pulse train. The pulse width modulator varies the duty cycle of the pulse train in direct proportion to the magnitude of the brake control signal. Thus, the duty cycle of the pulse train corresponds to the amount of braking effort desired.

Electronic wheel brake controllers further include an output stage which is electrically connected to the output of the pulse width modulator. The output stage typically has one or more power transistors which are connected between the towing vehicle power supply and the towed vehicle brake electromagnets. The power transistors, which are usually Field Effect Transistors (FET's), function as an electronic switch for supplying electric current to the towed vehicle brakes. The output stage may also include a driver circuit which electrically couples the output of the pulse width modulator to the gates of the FET's.

The output stage is responsive to the pulse width modulator output signal to switch the power transistors between conducting, or "on", and non-conducting, or "off", states. As the output transistors are switched between their on and off states in response to the modulator output signal, the brake current is divided into a series of pulses. The power supplied to the towed vehicle brakes and the resulting level of brake application are directly proportional to the duty cycle of the modulator generated output signal.

It is also known to include a manual override control with electronic wheel brake controllers. Such manual override controls typically include a potentiometer that is actuated by a sliding control lever or pushbutton that is moved by the vehicle driver. The potentiometer provides a manual brake control signal to the input of the analog pulse width modulator. The controllers are usually designed to discriminate between the manual brake control signal and the brake control signal supplied by the sensing unit and to respond to the greater signal.

BACKGROUND OF THE INVENTION

This invention relates to electronic trailer brake controllers.

The present invention contemplates an electronic trailer brake controller that includes a three axis acceleration sensor that is operable to generate at least one towing vehicle deceleration signal. The invention also includes a power control circuit adapted be connected between a towing vehicle power supply and a set of electrically actuated trailer brakes. The power control circuit is electrically connected to the three axis acceleration sensor and responsive to the at least one towing vehicle deceleration signal to supply a current to the set of trailer brakes that is proportional to the towing vehicle deceleration signal.

The present invention further contemplates that the three axis acceleration sensor generates three deceleration signals that are associated with three sensor orthogonal axes. Additionally, the power control circuit includes a microprocessor that receives said three deceleration signals and is responsive thereto to generate a towing vehicle composite deceleration signal. The power control circuit being responsive to the composite deceleration signal to supply a current to the set of trailer brakes that is proportional to the towing vehicle composite deceleration signal.

The invention also contemplates that the brake controller includes a The brake controller according to claim 2 further including a liquid crystal display for indicating operating conditions of the controller. The controller further includes a plurality of pushbuttons that are operative in co-operation with the liquid crystal display to program operating conditions for the controller. The controller also is operative to display warning messages on the liquid crystal display.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
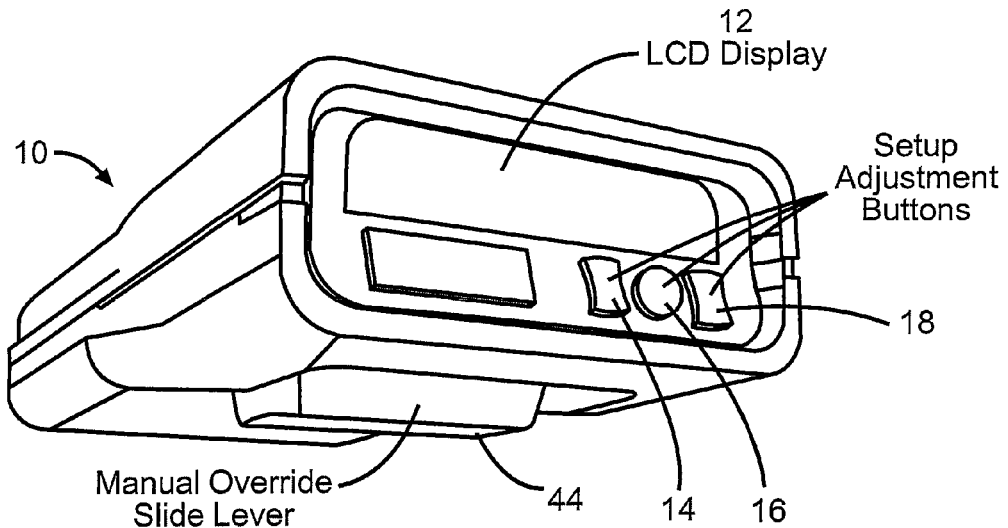
FIG. 1 illustrates an electronic brake controller in accordance with the present invention.

Referring now to the drawings, there is shown in FIG. 1 an electronic brake controller 10 that is in accordance with the present invention. As shown in FIG. 1, the brake controller 10 includes a Liquid Crystal Display (LCD) screen 12 and a set of three pushbuttons that are labeled 14, 16 and 18. The LCD screen 12 shows various symbols and numbers that are used for setting up the controller 10 and for monitoring brake performance. The screen 12 also can be used for troubleshooting the controller 10 and electric brake system. The pushbuttons are utilized to select a particular display for the screen 12 and to program and/or trouble shoot the controller 10. The pushbutton 14 shown to the left in FIG. 1 has an "up arrow" and is used to move in an upward direction on a display shown on the LCD screen 12. The pushbutton 18 shown to the right in FIG. 1 has a "down arrow" and is used to move in a downward direction on a display shown on the LCD screen 12. The pushbutton 16 shown in the center in FIG. 1 has an "asterisk" and is used to enter a selection shown on the LCD screen 12. The available displays are illustrated in the flow chart shown in FIGS. 4 and 5 and are described below.

Figure 2:
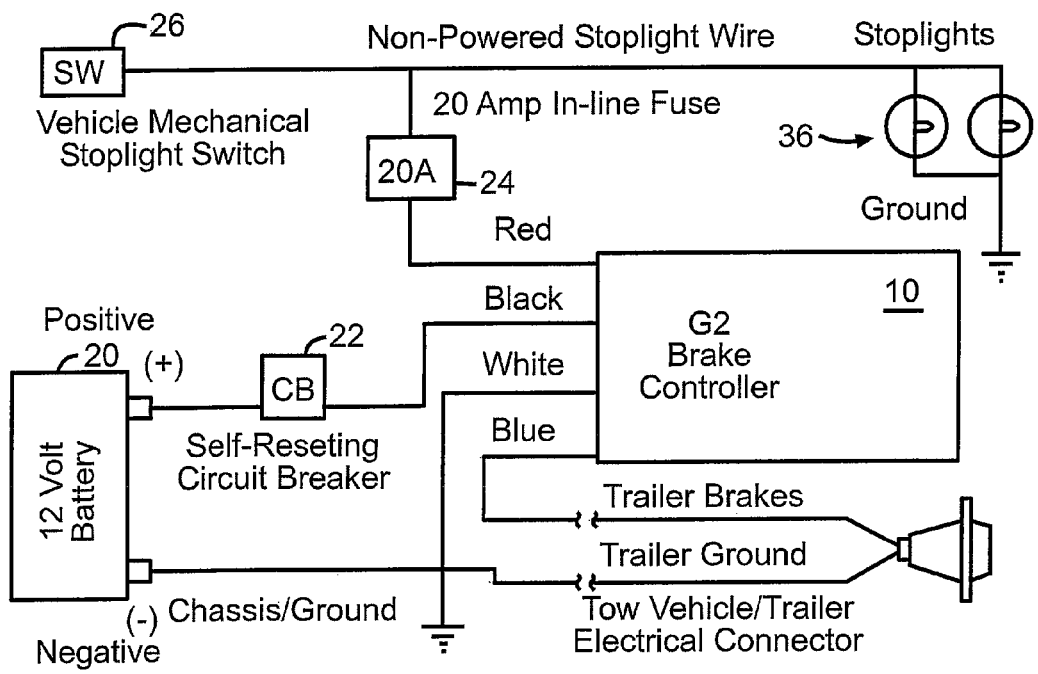
FIG. 2 is a schematic diagram for installation of the electronic brake controller shown in FIG. 1 in a vehicle equipped to tow a trailer.
Figure 3A:
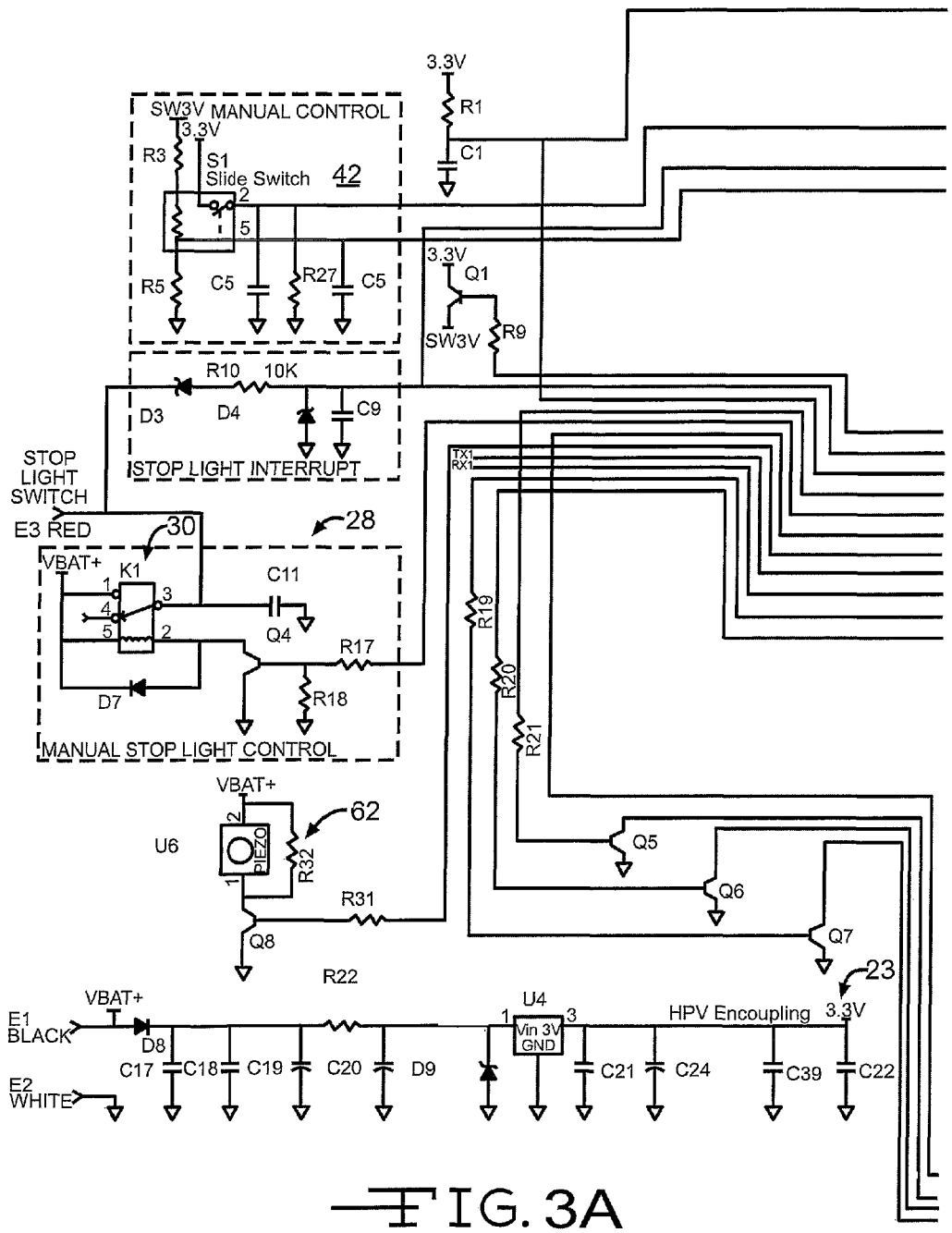
FIGS. 3A through 3E are a circuit diagram for the electronic brake controller shown in FIG. 1
Figure 3B:
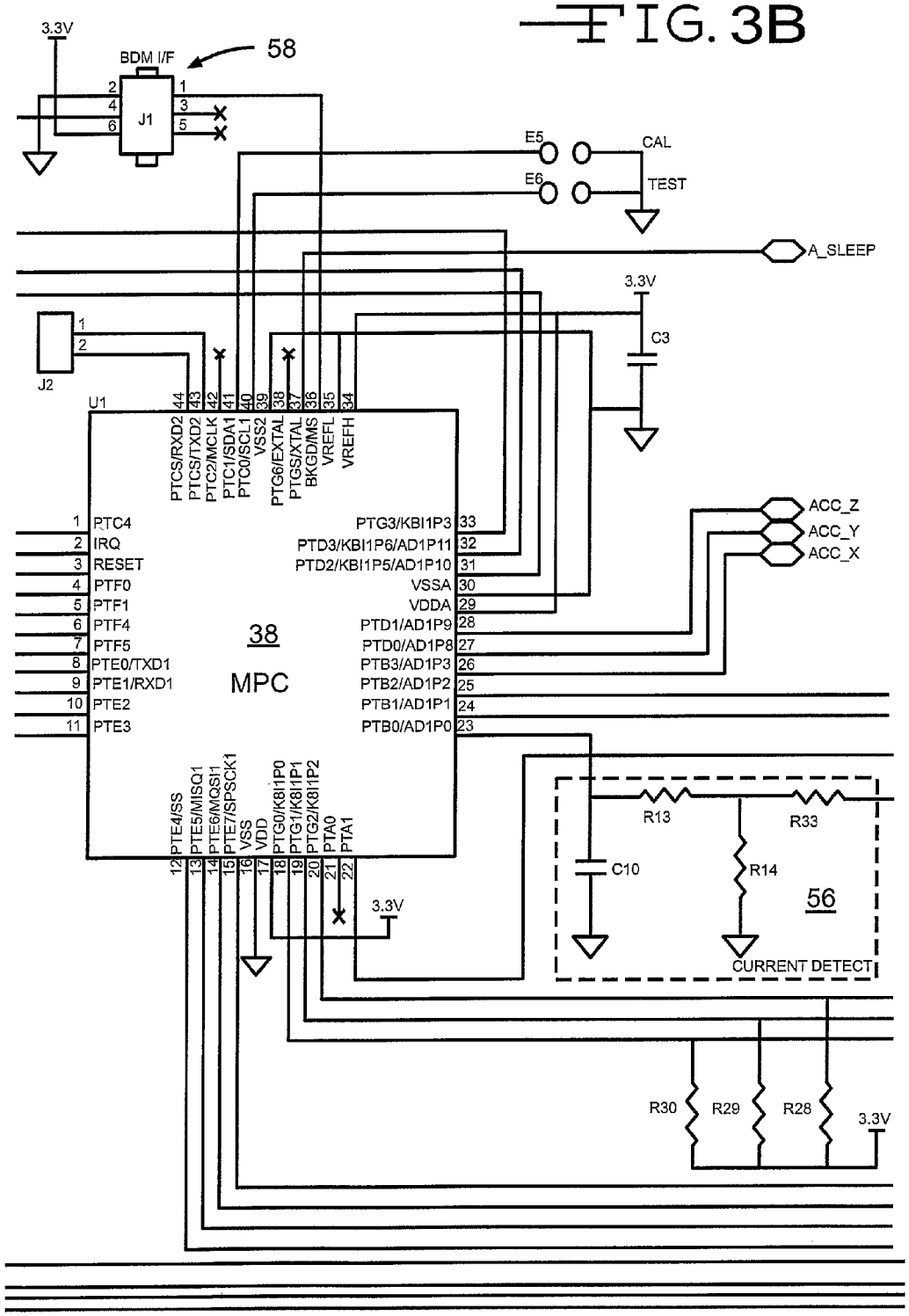
Figure 3C:
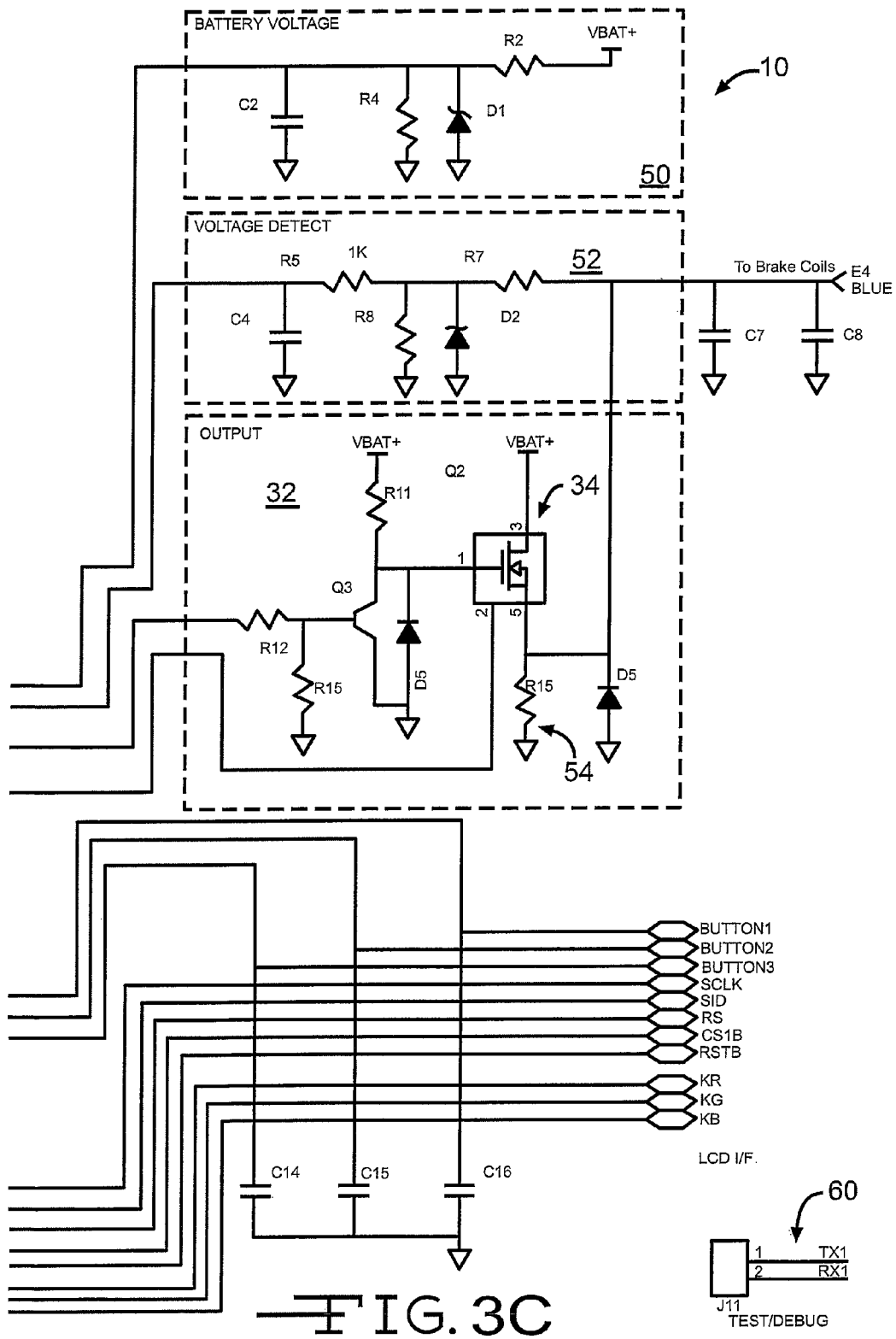
Figure 3D:
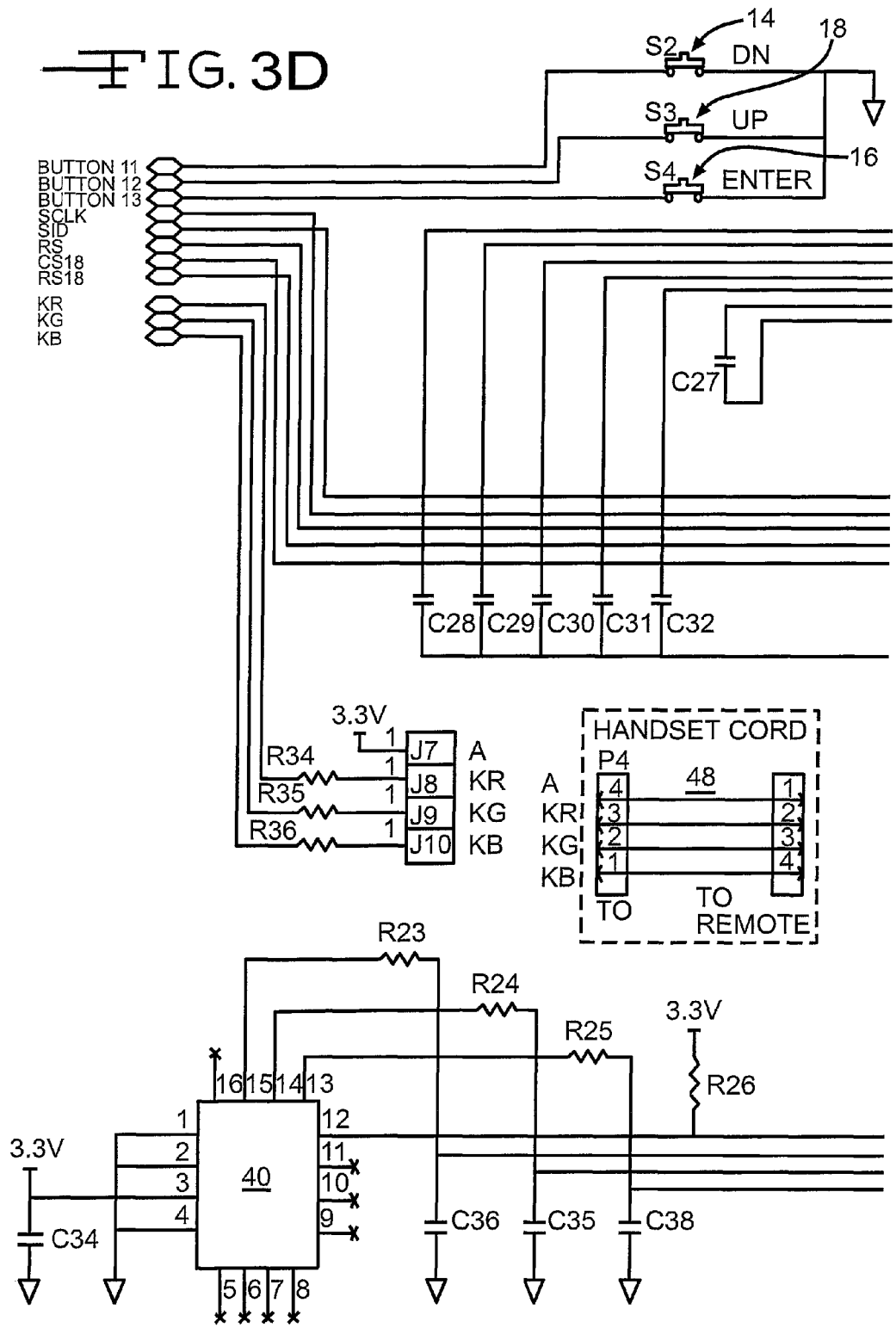
Figure 3E:
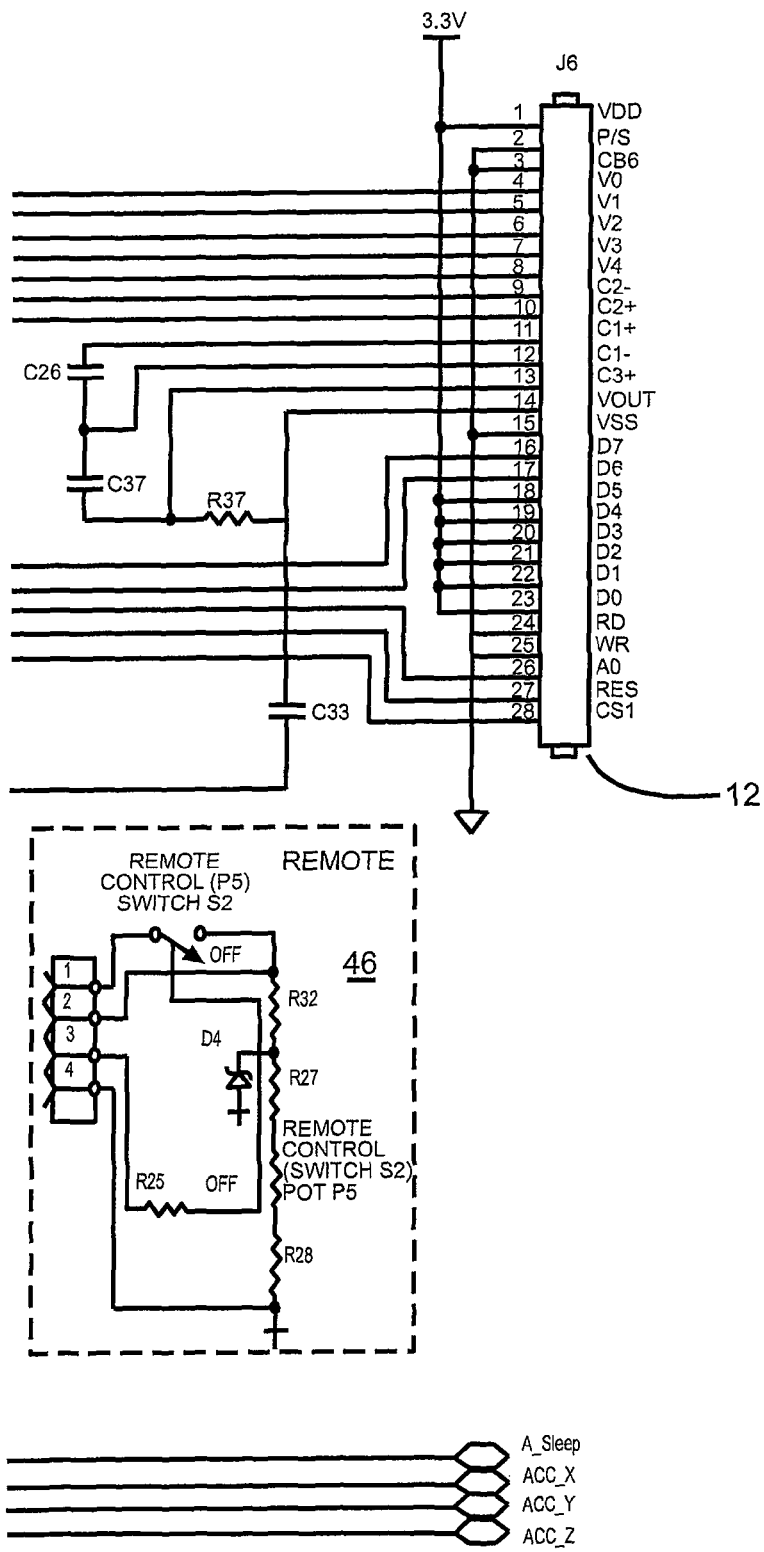

A schematic diagram for connecting the brake controller 10 with a towing vehicle electrical system and a set of trailer brakes is shown in FIG. 2 while a circuit diagram for the brake controller 10 is shown in FIGS. 3A and 3B. As illustrated in FIG. 2, a vehicle battery 20 is connected though a self resetting circuit breaker 22 by a black wire to supply power to a brake controller regulated power supply, which is labeled 23 in FIG. 3A. The brake controller 10 is also connected through an in-line fuse 24 to a towing vehicle stop light switch 26 by a red wire. As shown in FIG. 3A, the red wire is connected to a manual stop light control circuit 28 that includes a relay 30. Closure of the vehicle stop light switch 26 closes the relay 30 to supply power to a controller output circuit 32. Within the controller output circuit 32, a power Field Effect Transistor (FET) 34 is switched between conducting and non-conducting states to provide current through a blue wire to electric trailer brakes (not shown). Closure of the vehicle stop light switch 26 also illuminates the vehicle stop light lamps 36. Also shown in FIG. 2 is a white wire that is connected to the towing vehicle chassis to provide a circuit ground connection.

Turning now to the brake controller 10, as shown in FIG. 3B, the brake controller includes a faster and more advanced MicroProcessor Unit (MPU) 38 than has been used in prior art controllers. The MPU 38 includes additional input/output ports that allow processing of data from more sensors and inputs. An algorithm (not shown) is stored in a memory portion of the MPU for controlling the operation of the brake controller 10.

The controller 10 also includes a three axis acceleration sensor 40 that generates acceleration signals that are related to three orthogonal sensor axes. The generated acceleration signals are supplied to associated MPU input ports via connections labeled $ACC_X$, $ACC_Y$ and $ACC_Z$ in FIGS. 3A and 3B. The algorithm is responsive to the received acceleration signals to generate a composite deceleration signal when the towing vehicle brakes are applied. The deceleration signal is then utilized by the MPU 38 to generate a PWM signal for controlling the power FET 34 in the output circuit 32. Additionally, the MPU 38 is programmed to sense any signals generated by acceleration sensor 40 along the accelerometer axes when the towing vehicle is stationary. Such signals are the result of the force of gravity acting upon the sensor acceleration elements and are a function of any misalignment of the sensor orthogonal axes relative to the towing vehicle orthogonal axes. The towing vehicle orthogonal axes comprise a vertical axis, the vehicle Z-axis, and horizontal longitudinal and lateral axes, the vehicle X-axis and vehicle Y-axis, respectfully. The MPU utilizes the sensed signals when the vehicle is stationary and on a level surface to correct the sensor output signals for any misalignment between the sensor orthogonal axes and the towing vehicle to correct the sensor output signals for any misalignment between the sensor orthogonal. Thus, by utilizing a three axis acceleration sensor, it is possible to mount the brake controller 10 in any orientation relative to the towing vehicle. This is a significant improvement over prior art brake controllers that utilize one or two axis accelerometers and require orienting the brake controller parallel to the longitudinal, or X-axis, of the towing vehicle. Accordingly, the present invention provides a significant improvement over prior art brake controllers.

The brake controller MPU 38 also receives brake signals from a manual control circuit that is labeled 42 in FIG. 3A. The manual control circuit 42 is activated by a manual override lever 44 that extends from the bottom surface of the controller housing. Sliding the lever 44 provides for manual control of the trailer brakes. The controller 10 also may include an optional remote control switch 46 and handset cord 48 that is shown in FIG. 3B. The remote control switch 46 allows one person to check the operation of the trailer stop lights and is fully described in U.S. Pat. No. 6,557,952, which is incorporated herein by reference.

The brake controller 10 further includes a battery voltage monitoring circuit 50 that monitors the battery voltage supplied to the controller and is connected between the towing vehicle battery 20 and a battery voltage monitoring input port on the MPU 38. The monitoring circuit 50 includes a Zener diode D1 to limit the voltage applied to the MPU port and a filter capacitor C2. The MPU 38 uses the battery voltage received from the circuit 50 as a self-diagnostic tool. If a battery voltage is present at the MPU input pin, but no output voltage is generated when needed, the MPU 38 determines that a fault has occurred and disables itself while providing a visual warning signal via the LCD display 12 to the towing vehicle driver. The battery voltage monitoring circuit 50 is described in U.S. Pat. No. 7,311,364 which is incorporated herein by reference.

The brake controller 10 also includes a voltage detection circuit 52 that verifies that there is an output voltage to the trailer brake coils by monitoring the voltage being supplied to the trailer brakes. If there is no voltage when a voltage is required, it is an indication that the power FET 34 in the output circuit 32 has shut down due to a short and the MPU 38 displays a message "OUTPUT SHORT/No Brakes" on the LCD screen 12. Alternately, when the controller 10 is in a diagnostics display mode, the output voltage measured by the voltage detection circuit 52 is displayed upon the LCD screen 12. It is noted that there is a resistor 54 connected between the source terminal of the output circuit FET 34 and ground in the Output circuit 32. The resistor 54 enhances the square wave shape of the output voltage supplied to the brake coils while also preventing the output voltage duty cycle from becoming too great when there is not load present. The resistor 54 is sized to draw only milliamps and a typical single brake coil pulls three amps. Thus, the resistor 54 does not pull enough current to start to load the output circuit FET 34.

A current detection circuit 56 is provided that monitors the current being supplied to the trailer brakes. The output circuit 32 also includes a small MOSFET (not shown) connected in parallel with power FET 34 that is operative to supply a feedback current that is proportional to the current flowing through the power FET to the brake coils. Alternately, the current monitoring function may be included in the power FET 34. The applicable current monitoring device is connected to a current detection circuit 56 that includes a current feedback voltage divider. The voltage developed across the voltage divider is proportional to the current being supplied to the brake coils and is applied to a current feedback port of the MPU 38. If the voltage across the feedback voltage divider exceeds a predetermined current shutdown threshold, $T_1$, an over-current condition exists and the MPU 38 will place the power FET 34 in its non-conducting state for a predetermined time period. The MPU 38 will also provide a visual warning signal via the display screen 12 to the towing vehicle driver. At the end of the time period, the MPU 38 will reset the power FET 34, returning it to its conducting state. However, if the current still exceeds the corresponding threshold, the power FET 34 will be returned to its non-conducting state for another predetermined time period. The cycling of power FET 34 will continue until the over-current condition ceases.

The controller 10 also includes a first connector 58 that is used to develop the algorithm code for the controller and to program the MPU 12. The controller 10 further includes a second connector 60 that is used for testing and debugging the unit.

The brake controller 10 further includes an audible alarm 62 that signals the detection of a fault condition to the towing vehicle driver. However, the audible alarm can be disabled through the screen menu.

Figure 4A:
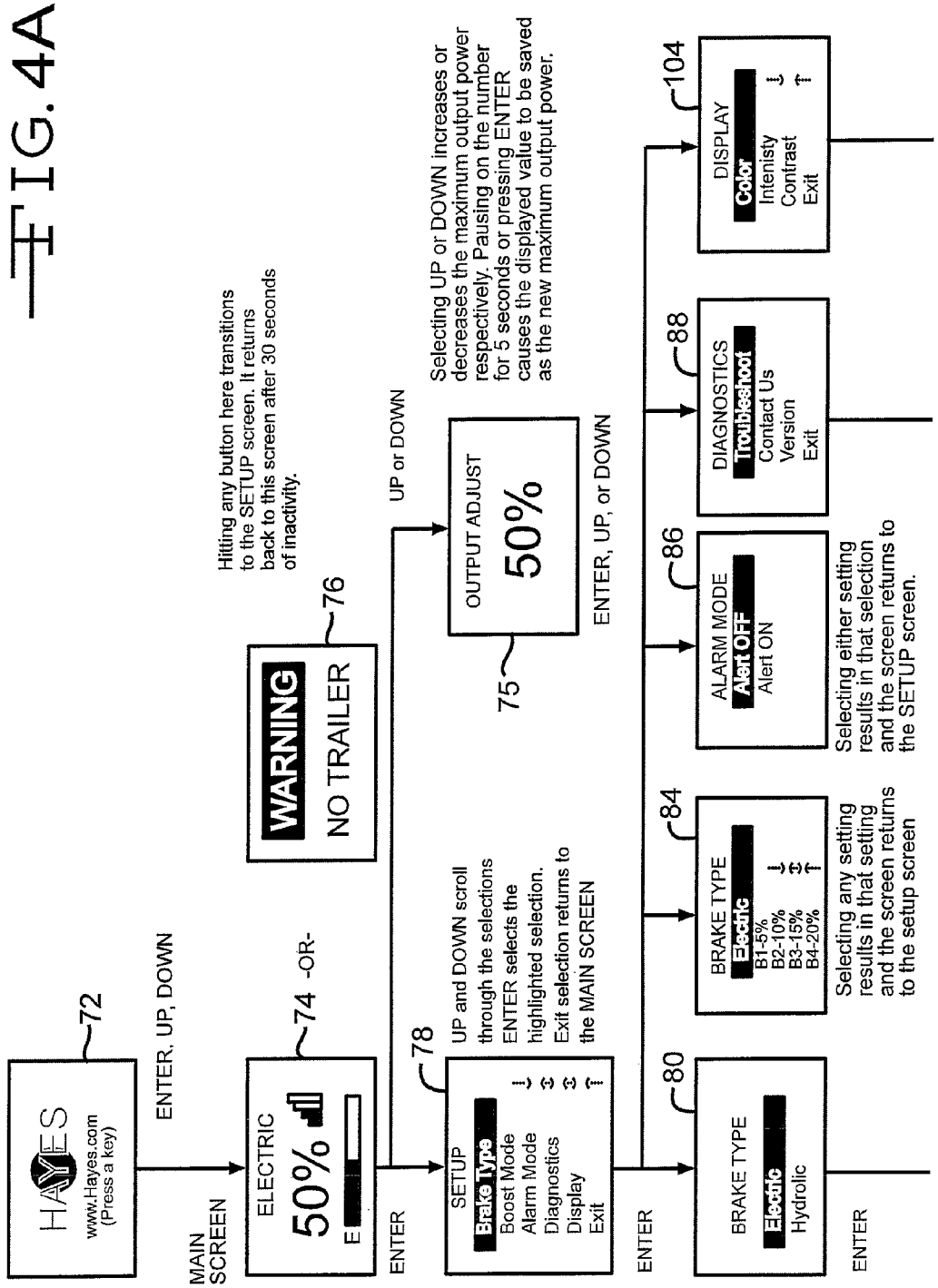
FIGS. 4A and 4B are a flow chart for programming the electronic brake controller shown in FIG. 1
Figure 4B:
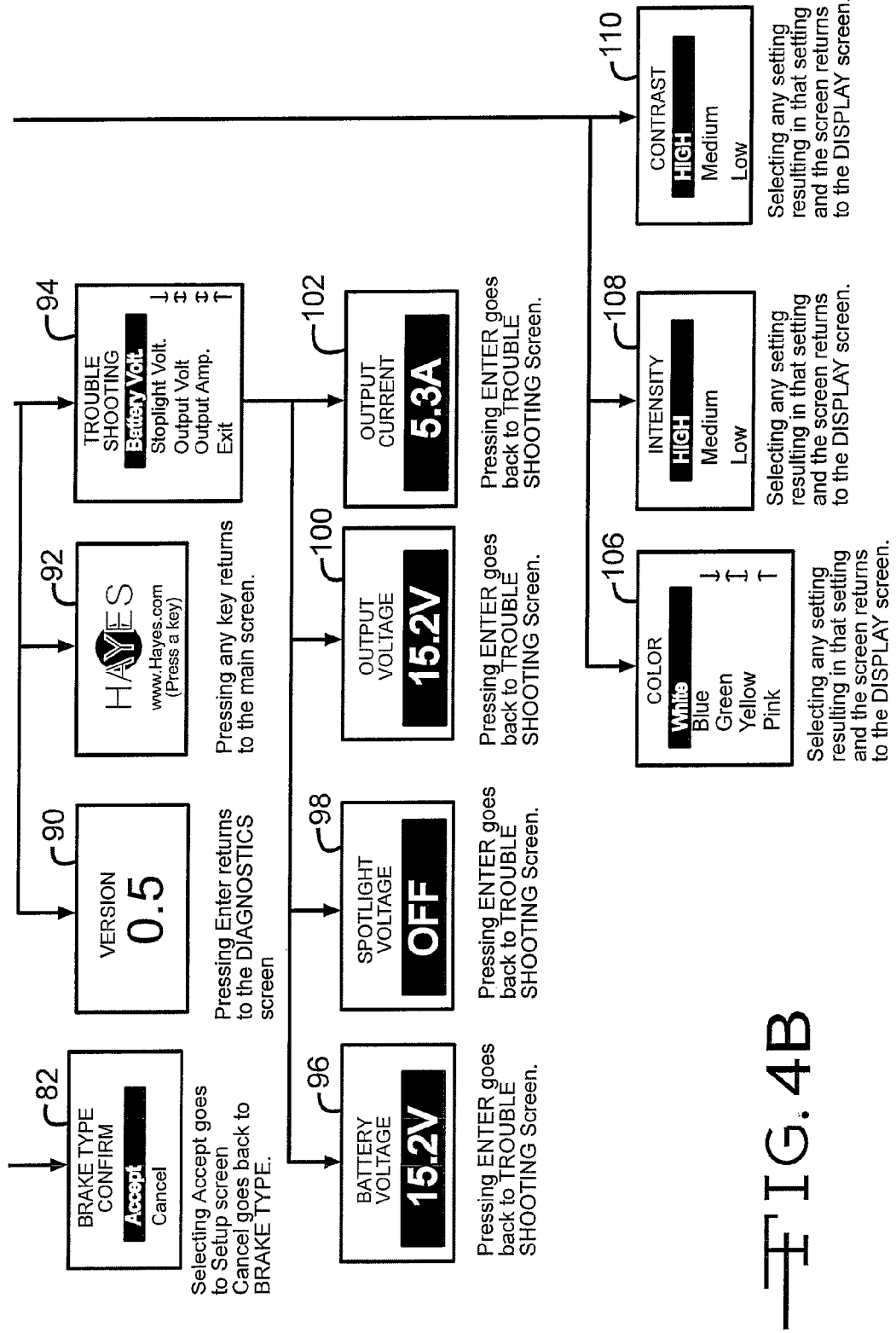
Figure 5:
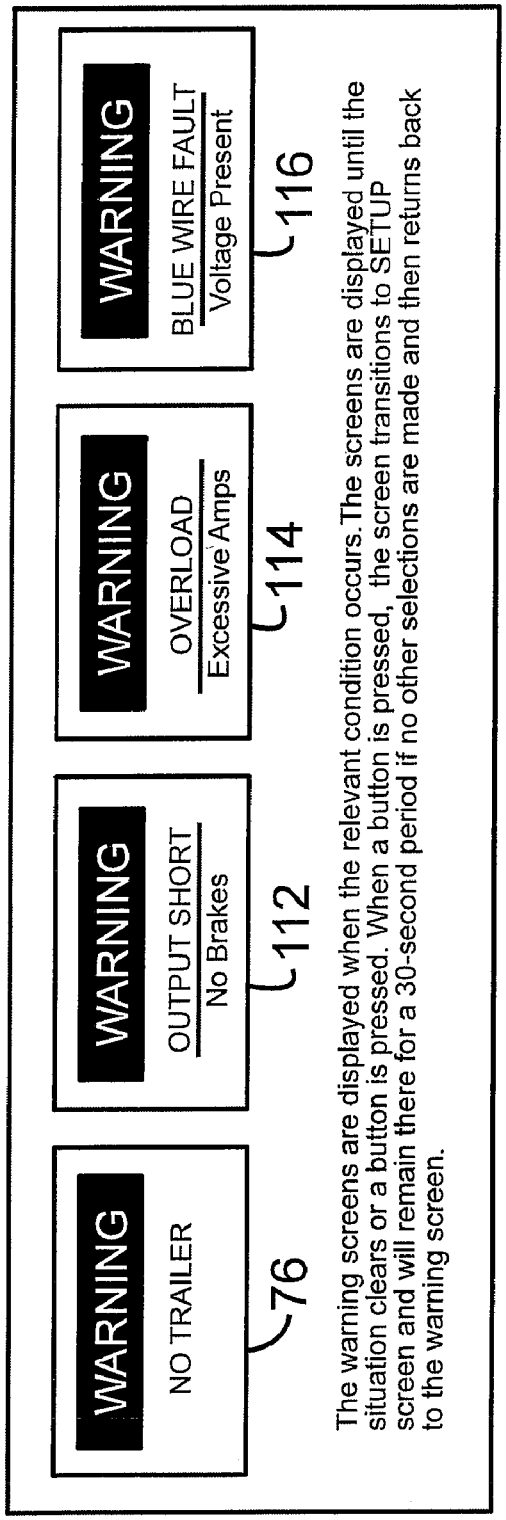
FIG. 5 illustrates warning messages that may be displayed during operation of the brake controller.

As described above, the controller 10 includes a LCD screen 12 and three pushbuttons 14, 16 and 18 that are used with the MPU control algorithm to set up and trouble shoot the controller. The operation of the screen and pushbuttons are shown by the flow chart shown in FIG. 4. FIGS. 4 and 5 also illustrate typical displays for the LCD screen 12. The flow chart is entered when the towing vehicle ignition switch is closed and the screen shown at 60 in FIG. 4 is displayed. Upon pressing either the up or down button, 14 or 18, the control algorithm advances to display either a main screen 74 showing normal operation or a fault screen 76. One of these screens will be displayed upon depression of the towing vehicle brake pedal and the screen will remain displayed upon release of the brake pedal.

Considering first the main screen 74, the screen displays the percent power being applied to the brakes, the amount of brake boost, the brake type and, as a bar graph, the power/voltage being applied to the trailer brakes. The scale for brake power is 10 to 100 percent with the unit being preset at 50 percent. The output brake power may be adjusted by depressing either the up or down pushbutton which will cause an output power screen 75 to be displayed and the output power changed by an increment of five percent in accordance with the pushbutton that was depressed. Subsequent depression of the up pushbutton 14 will further increase the output power in five percent increments while subsequent depression of the down pushbutton 18 will further decrease the output power in five percent increments. A pause in pressing either the up or down pushbutton for more than five seconds or depression of the enter pushbutton 16 will cause selection of the current power level being displayed and the algorithm to transfer back to the main screen 74. The brake boost is preset at ten percent while the type of brake is preset as "electric". The other parameters may be adjusted by pressing the enter pushbutton 16 which will cause a set up screen 78 to be displayed.

The set up screen lists five functions that are accessible to the towing vehicle driver. A specific function is selected by depressing the up or down pushbuttons 14 and 18 and is then entered by depressing the enter pushbutton 16. Upon selecting exit and then depressing the enter pushbutton 15, the algorithm transfers back to main screen 74.

If the brake type function is selected on the set up screen 78, a bake type selection screen 80 is displayed. The driver may select either electric or hydraulic by pressing the up or down pushbuttons, 14 and 18. Upon then depressing the enter pushbutton 16, a brake type confirm screen 82 is displayed. Either accept or cancel is selected by pressing the up or down pushbuttons, 14 and 18, and then confirmed by pressing the enter pushbutton 16. Upon confirming accept, the algorithm returns to the setup screen 78. If cancel is selected, the algorithm returns to the brake type screen 78. The electric brake setting is used when the trailer is equipped with electric only brakes while the hydraulic setting is used when the trailer is equipped with electric over hydraulic brakes.

If the boost mode is selected on the setup screen 78, the values available for brake boost are displayed upon a boost mode screen 84. The boost is the amount of power applied to the trailer brakes when the towing vehicle brake pedal is initially depressed but the acceleration sensor 40 has not let detected a vehicle deceleration. Thus, the brake boost prevents the trailer from overriding the towing vehicle. The boost level may be set from zero to 20 percent brake power in five percent increments. The desired level is first selected by depressing the up or down pushbuttons 14 and 18 and then confirmed by depressing the enter pushbutton 16. Depressing the enter pushbutton 16 also transfers the algorithm back to the setup screen 78.

If the alarm mode is selected on the setup screen 78, the audible alarm 62 may be turned on or off with the alarm mode screen 86. Again the desired operation is selected by depressing the up or down pushbuttons 14 and 18 and then confirmed by depressing the enter pushbutton 16. Depressing the enter pushbutton 16 also transfers the algorithm back to the setup screen 78.

If the diagnostics function is selected on the setup screen 78, the algorithm transfers to the diagnostics screen 88. The user may then select from the choices of controller version, contact information or trouble shooting by depressing the up or down pushbuttons 14 and 18 and then confirmed the selection by depressing the enter pushbutton 16. Upon confirming a selection a corresponding screen, labeled 90, 92 or 94 is displayed. When the version screen 90 is displayed, pressing any one of the pushbuttons will cause the algorithm to return to the diagnostics screen 88. When the contact information screen 92 is displayed, pressing any one of the pushbuttons will cause the algorithm to return to the main screen 74. With regard to the trouble shooting screen, the user may select a specific trouble shooting function by depressing the up or down pushbuttons 14 and 18 and then confirming the selection by depressing the enter pushbutton 16. The selection of a specific trouble shooting function will cause an associated screen to be displayed. The associated screens include a battery voltage display 96 that shows the current value of the battery voltage and a stoplight display 98 that shows whether or not the trailer stoplight lamps are illuminated when the towing vehicle brake pedal is depressed. The associated screens also include an output voltage display 100 that shows the voltage being supplied to the trailer brakes and an output current display 102 that shows the current being supplied to the trailer brakes. The algorithm will return to trouble shooting screen from any of the associated screens upon depression of the enter pushbutton 16. The algorithm transfers from the trouble shooting screen 94 back to the main screen 74 when exit is selected and confirmed.

If the display is selected on the setup screen 78, the algorithm transfers to a display screen 104 where the towing vehicle may select from color, intensity or contrast functions for adjustment of the display on the LCD screen 12. Again, the specific function is selected by depressing the up or down pushbuttons 14 and 18 and then confirmed the selection by depressing the enter pushbutton 16. The algorithm transfers from the display screen 104 back to the main screen 74 when exit is selected and confirmed. The up or down pushbuttons 14 and 18 are used to select a display color on the color screen 106. Confirming the selection with the enter pushbutton 16 results in the use of the selected color and a transfer back to the display screen 104. An intensity screen 108 and a contrast screen 110 are also available for adjustment of the display and are operated in the same manner as the color screen 106.

Turning now to the warning message illustrated in FIG. 5, there are four messages shown. The MPU 38 is constantly monitoring selected operating parameters of the controller 10 and will display a specific warning message on the LCD screen 12 upon detection of a problem. The warning screen will remain displayed until the condition causing the display is corrected or one of the pushbuttons is depressed. Upon depressing one of the pushbuttons, the setup screen 78 will be displayed for 30 seconds. If no other selections are made, the condition causing the warning screen to be displayed remains, the warning screen will be again displayed after the 30 second period passes.

One of the warning screens 76 displays "NO TRAILER" when the voltage detection circuit 52 determines that there is no trailer attached to the towing vehicle. If this is the case, the warning screen may be cleared by depressing any one of the three pushbuttons. This warning also is displayed if the controller is set for electric brakes and a trailer with electric over hydraulic brakes is attached to the towing vehicle. Clearance of the screen requires reprogramming the controller 10 via the brake type screen 80. Additionally, this warning is displayed if the blue wire that provides power to the trailer brakes is improperly connected. Correction requires correctly connecting the blue wire.

A second warning screen 112 displays the messages "OUTPUT SHORT" and "No Brakes". This screen is triggered if the current detection circuit 56 detects excessive output current to the trailer brakes when the brakes are applied. An excessive output current may be caused by direct short to ground in either the towing vehicle wiring or the trailer wiring. An excessive output current also may be caused by faulty brake magnets. In order to clear the message, the wiring and/or brake magnets must be inspected and corrected as necessary.

A third warning screen 114 displays the message "OVERLOAD" and "Excessive Amps". This screen is triggered if the current detection circuit 56 detects excessive output current to the trailer brakes when the brakes are applied that occurs with an intermittent short, defective brake magnets or there are too many brake magnets. With regard to the last condition, the controller is designed to supply brakes associated with up to four trailer axles. If there are more than four axles equipped with brakes this warning message will be displayed and the trailer should not be towed. Inspection and repair would be required to correct an intermittent short condition or defective brake magnets.

A fourth warning screen 116 displays the message "BLUE WIRE FAULT" and "Voltage Present". This screen is triggered displayed if an unexpected 12 volts is detected on the blue wire connecting the controller 10 to the trailer brakes. The 12 volt condition may be due to faulty wiring or a defective trailer break away switch. Correction requires inspection of the wiring and break away switch and repair/replacement, as necessary.

It will be appreciated that the messages shown in FIGS. 4 and 5 are meant to exemplary and that the invention also may be practiced with different and/or additional messages than those shown.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. Thus, while the invention has been illustrated and described as utilizing a LCD display, it will be appreciated that the invention also may be practiced with other commercially available displays.

What is claimed is:

1. A brake controller comprising:

a three axis acceleration sensor that generates three deceleration signals that are associated with three sensor orthogonal axes and up to three correction deceleration signals when the towing vehicle is stationary; and a power control circuit adapted to be connected between a towing vehicle power supply and a set of electrically actuated trailer brakes, said power control circuit electrically connected to said three axis acceleration sensor, said power control circuit including a microprocessor, said microprocessor receiving said three deceleration signals and said correction deceleration signals, said microprocessor responsive to said correction deceleration signals to compensate said deceleration signals for any misalignment between said sensor orthogonal axes and three towing vehicle orthogonal axes, said microprocessor further responsive to said compensated deceleration signals to generate a towing vehicle composite deceleration signal, said power control circuit further responsive to said composite deceleration signal to supply a current to said set of trailer brakes that is proportional to said towing vehicle compensated deceleration signal.

2. The brake controller according to claim 1 further including a liquid crystal display for indicating operating conditions of the controller.

3. The brake controller according to claim 2 also including a plurality of pushbuttons that are operative in co-operation with said liquid crystal display to program operating conditions for the controller.

4. The brake controller according to claim 2 also including a plurality of pushbuttons that are operative in co-operation with said liquid crystal display to trouble shoot operating conditions for the controller.

5. The brake controller according to claim 2 also including a voltage detection circuit connected to said power controller circuit, said voltage detection circuit operative to monitor the voltage being supplied to the trailer brakes said power controller circuit responsive to an output of said voltage detection circuit to provide a warning message on said liquid crystal display when said output voltage does not meet threshold criteria.

6. The brake controller according to claim 5 further including an audio signal generator connected to said power controller circuit, said power controller circuit operative to cause an audible warning to be generated with a warning message is shown on said liquid crystal display.

7. The brake controller according to claim 2 also including an output current detection circuit connected to said power controller circuit, said output current detection circuit operative to provide a warning of excessive output current from said power controller circuit to the trailer brakes, said power controller circuit responsive to excessive output current warning to provide a warning message on said liquid crystal display.

8. The brake controller according to claim 3 also including a battery voltage detection circuit connected to said power controller circuit, said battery voltage detection circuit operable to monitor the voltage available from a towing vehicle battery, said liquid crystal display responsive to operation of said pushbuttons to display said towing vehicle battery voltage.

9. The brake controller according to claim 5 wherein said liquid crystal display responsive to operation of said pushbuttons to display said output voltage monitored by said voltage detection circuit.

10. The brake controller according to claim 7 wherein said liquid crystal display responsive to operation of said pushbuttons to display said output current monitored by said current detection circuit.

* * * * *